United States Patent [19]

Stephenson, III

[11] Patent Number: 5,790,276
[45] Date of Patent: Aug. 4, 1998

[54] APPARATUS AND METHOD FOR IMAGE REFORMATTING

[75] Inventor: Stanley Ward Stephenson, III, Spencerport, N.Y.

[73] Assignee: Eastman Kodak Company, Rochester, N.Y.

[21] Appl. No.: 388,774

[22] Filed: Feb. 15, 1995

[51] Int. Cl.$^6$ .................................................. H04N 1/04
[52] U.S. Cl. .............................. 358/487; 355/18; 355/42; 355/55
[58] Field of Search ...................... 358/487, 496, 358/497, 296; 355/43, 44, 45, 48, 49, 55, 56, 57, 18, 42, 40, 36; 354/410, 412; H04N 1/04

[56] References Cited

U.S. PATENT DOCUMENTS

| | | | |
|---|---|---|---|
| 1,894,264 | 1/1933 | Chretien | 355/43 |
| 1,894,265 | 1/1933 | Chretien | 355/43 |
| 3,263,555 | 8/1966 | Scheib | 355/43 |
| 3,600,089 | 8/1971 | Walter | 355/99 |
| 3,698,807 | 10/1972 | Weigl | 355/45 |
| 4,027,968 | 6/1977 | Spenge-Bate | 355/46 |
| 4,072,420 | 2/1978 | Wicks et al. | 355/100 |
| 4,082,446 | 4/1978 | Driscoll et al. | 355/45 |
| 4,482,924 | 11/1984 | Brownstein | 355/40 |
| 4,591,263 | 5/1986 | Fergg | 355/43 |
| 4,592,649 | 6/1986 | Freitag et al. | 355/43 |
| 4,675,986 | 6/1987 | Yen | 29/603 |
| 4,800,454 | 1/1989 | Scwarz et al. | 360/103 |
| 4,809,064 | 2/1989 | Amos et al. | 358/500 |
| 4,816,939 | 3/1989 | Ford et al. | 360/77.03 |
| 4,821,073 | 4/1989 | Backus et al. | 355/68 |
| 4,903,068 | 2/1990 | Shiota | 355/20 |

*Primary Examiner*—Edward L. Coles, Sr.
*Assistant Examiner*—Madeleine AV Nguyen
*Attorney, Agent, or Firm*—Peter J. Bilinski; Robert Luke Walker

[57] ABSTRACT

An apparatus for image presentation and reformatting comprising an image projector for transmitting an image from an image source, a sizing element for transmitting a selected portion of the image, an image display device, and an image recapture device. A source transducer and target transducer are provided for reading source information and target information, respectively. Such information is provided to a control device which automatically adjusts an exposure adjustment device to enhance the quality of the reformatted image.

28 Claims, 2 Drawing Sheets

APPARATUS AND METHOD FOR IMAGE REFORMATTING

FIELD OF THE INVENTION

The present invention generally relates to the field of image presentation and reformatting, such as when reprocessing and cropping film. More particularly, the present invention relates to a simplified apparatus and method for reformatting original images, such as slides or negatives, and recapturing the images using a variety of source and target media.

BACKGROUND OF THE INVENTION

After an image has been captured on photographic film, it is often desirable to reformat the image to improve its aesthetic appeal. For example, it may be desirable to cut off (i.e., "crop") portions of the image and enlarge a selected portion to obtain a desired image composition. In addition, it is sometimes desirable to alter the color balance or density of the image to enhance its appearance. Altering color balance may further be required when transferring images between incompatible film types, such as those utilizing different emulsions.

Typically, image reformatting is performed by a film processor after the initial processing of the film. For example, after the film has been developed into negatives and prints, the images can be cropped and color balanced into a reformatted set of prints, as is generally disclosed in commonly-assigned U.S. Pat. No. 4,809,064 to Amos et al. During such reprocessing, the image is projected onto a beam splitter which directs the image to both a video system for viewing the image and print paper for forming a print of the image. Color balance and density can be manually altered utilizing color filters in conjunction with the light source. For example, color correction can be based upon aesthetic criteria when viewing the image and/or by determining the source and target film types and manually compensating accordingly. Image cropping can be performed by the combination of moving the original image relative to the video system and the print paper, and by enlarging the selected portion of the image utilizing two zoom lenses, one positioned between the beam splitter and the print paper and the other positioned between the beam splitter and the video system. By operatively interconnecting the two zoom lenses, the image seen on the video display should generally correspond with the image formed onto the print paper.

Utilizing the above-described system, a print (i.e., on the print paper) is formed which represents the reformatted image. In order to produce print copies of a particular reformatted image, the same process of reformatting must be performed. Alternatively, a permanent negative of the reformatted image may be produced by using a capture film instead of photographic paper, and copies of the reformatted image may be produced from the reformatted negative.

It can be appreciated that it would be desirable to provide a simplified process for reformatting original images. For example, such a process may avoid the need to utilize two separate and operatively-interconnected zoom lenses. Further, such a process would advantageously produce reformatted images which can readily be transferred into negatives to facilitate production of copies of the reformatted image. Such a system could advantageously accommodate transfer of images from positive to negative, negative to positive, positive to positive, etc., and will further accommodate a wide range of illuminant film types, such as daylight-flash or tungsten.

SUMMARY OF THE INVENTION

In accordance with the present invention, an apparatus is provided for presentation and reformatting of an image. The apparatus generally includes an image projector for transmitting an image from an image source, a magnifier for receiving and transmitting a selected portion of the image, an image display device positioned to receive the selected portion of the image from the magnifier, and an image recapture device positioned to receive the selected portion of the image from the magnifier. The invention advantageously provides an apparatus which can be used to display and recapture reformatted images, while only requiring the use of a single magnifier.

In one embodiment, the apparatus further includes a deflector for allowing presentation of the selected portion of the image in at least two different directions. The deflector can be positioned between the magnifier and each of the image display device and the image recapture device. The deflector can be a half mirror, wherein part of the image is deflected and part is transmitted, or preferably a pivoting mirror, wherein the image is either completely deflected or not deflected at all. For example, in a preferred embodiment, the image is deflected to the image display device when the mirror is in the image path, and travels in a direct path to the image recapture device when the mirror is out of the image path. As used herein, the term "deflect" means to change direction, and can include reflection and/or refraction.

The apparatus can further include a moving device for providing relative movement between the image source and the image recapture device. In one embodiment, the image projector includes an image holder, and the moving device includes a movable x-y table (i.e., a table movable in a plane perpendicular to the image path) operatively associated with the image holder.

In another embodiment, the apparatus further includes a source information reader for reading information regarding the image source. For example, such information can include original film type (e.g., source emulsion). This information can be used to adjust exposure times and to correct for color shift during the recapturing process.

The image recapture device preferably includes a camera having a shutter mechanism and a positioning device for positioning an image target (e.g., film) in alignment with the shutter mechanism and projected image. Accordingly, the reformatted image will be recaptured onto the image target in a manner similar to that of a standard camera. The film can then be processed into negatives, prints, slides, or any desired format.

The image display device can include any appropriate display device. For example, the image display device can include a video camera (e.g., utilizing solid state, charge coupled devices) and associated video display. Preferably, the image display device includes a projection display screen.

In another aspect of the present invention, a method for presenting and reformatting an image is provided. The method generally includes the steps of transmitting an image from an image source, magnifying and transmitting a selected portion of the image, receiving and displaying the selected portion of the image, and receiving and recapturing the selected portion of the image. The method displays and recaptures reformatted images, while advantageously requiring the use of only a single magnifying and transmitting step.

In one embodiment, the method further includes, after the magnifying and transmitting step, the step of deflecting the selected portion of the image in a first direction. For example, the step of deflecting can include transmitting the selected portion of the image onto a mirror. Preferably, the method further includes the step of moving the mirror such that the selected portion of the image travels in a second direction. In a preferred embodiment, the first direction is toward an image display device and the second direction is toward an image recapture device.

In another embodiment, the method further includes the step of moving the image source relative to the image recapture device. For example, such a step can be utilized to center the selected portion of the image on the corresponding image display and image recapture devices. Preferably, the step of moving the image source includes moving an x-y table (e.g., in a plane perpendicular to the image path) that is operatively associated with the image source.

In another aspect of the present invention, an apparatus for image reformatting is provided. The apparatus generally comprises an image projector for transmitting an image from an image source, a source transducer for reading source information regarding the image source, an image recapture device for providing a selected portion of the image to an image target, a target transducer for reading target information regarding the image target, an image adjustment device (e.g., a color compensation device or an exposure control device) for modifying the image, and a control device for receiving the source and target information and providing an output corresponding with a desired setting of the image adjustment device. Such an apparatus advantageously provides automatic image adjustment based upon information provided by both the image source and the image target.

In one embodiment, the apparatus further includes a magnifier, positioned between the image projector and the image recapture device, for receiving and transmitting a selected portion of the image. The apparatus can also include an image display device for displaying the image. For example, the image display device can include a projection display screen or, alternatively, a video display. To allow for presentation of the image to both the image recapture device and the image display device, the apparatus can further include a deflector (e.g., a pivotable mirror or beam splitter) operatively positionable between the image projector and each of the image display device and the image recapture device.

In yet another embodiment, the apparatus further includes a moving device for providing relative movement between the image source and the image recapture device. For example, the moving device can comprise a movable x-y table operatively associated with the image source. Alternatively, the x-y table could be operatively associated with the image recapture device.

In yet another aspect, the present invention provides a method for reformatting an image utilizing an apparatus including an image source, an image target, an image adjustment device, a control device, and an image recapture device. The method generally includes the steps of reading source information regarding the image source, reading target information regarding the image target, transmitting the source and target information to the control device and generating an output corresponding with a desired setting of the image adjustment device, transmitting an image from the image source, adjusting the image adjustment device to modify the image, and recapturing the modified image onto the image target.

The method can further include the step of magnifying and transmitting a selected portion of the image. In addition, the method can further include the step of displaying the image so that the image can be previewed before being recaptured onto the image target.

In another embodiment, the method further includes the step of deflecting the image in a first direction. For example, the step of deflecting can include the step of transmitting the image onto a mirror. In such an embodiment, the mirror can be moved such that the image travels in a second direction. Such first and second directions can advantageously correspond with the image falling upon the image display device and the image recapture device, respectively.

DETAILED DESCRIPTION

Figure 1:
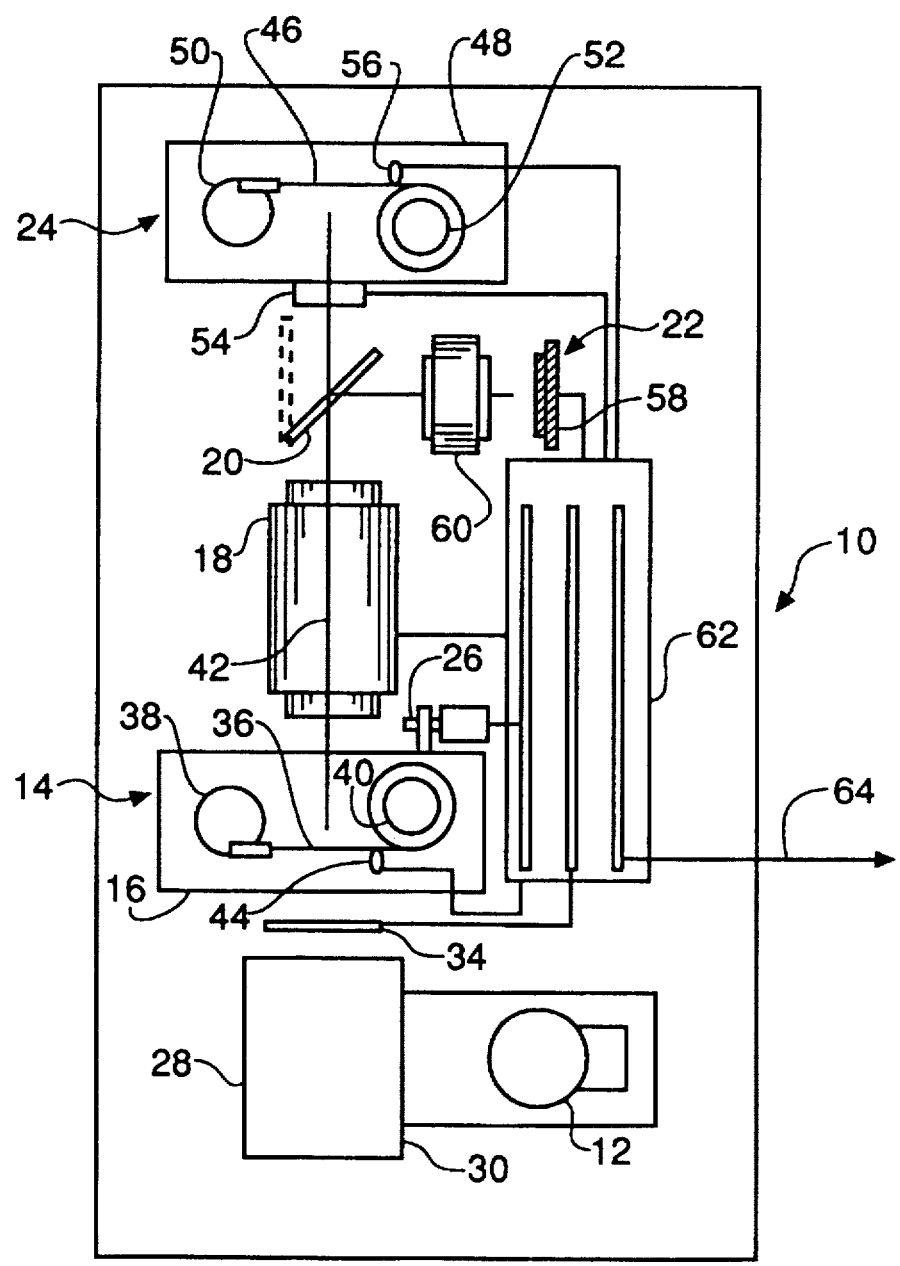
FIG. 1 is a schematic plan view of one embodiment of the present invention.

One embodiment of the present invention is shown in the apparatus 10 schematically illustrated in FIG. 1. The apparatus 10 includes a light source 12 for projecting light through an image source 14 positioned in an image source holder 16. The illustrated apparatus 10 further includes a sizing element 18 for sizing (enlarging or reducing) a selected portion of the image source 14, and a deflector 20 for allowing presentation of the selected portion of the image source 14 in at least two different directions. An image display device 22 and an image recapture device 24 are provided to allow for selective display and/or recapturing of the selected portion of the image. A moving device 26 is operatively associated with the image source holder 16 to allow selective movement of the image source 14 relative to one or more of the other elements of the apparatus 10.

The light source 12 is designed to provide the required light characteristics to the image source 14 such that an accurate representation of the image can be formed. For example, an incandescent light bulb can be used. The light source 12 is interconnected with an integrating box 28 having a light inlet 30 for receiving light from the light source 12, and a light outlet 32 for transmitting the integrated light toward the image source 14. The integrating box 28 is designed to integrate the light emanating from the light source 12 to provide a relatively uniform light beam to the source image.

A filter array 34 is positioned adjacent the light outlet 32 of the integrating box 28 and allows for color compensation of the image source 14. For example, the filter array 34 can comprise three separate variable filters capable of blocking three primary colors. For instance, a yellow filter rotates to vary the illuminant content of blue light between 100% and 70%. Similarly, a magenta filter varies the green content of light between 100% and 70%, and a cyan filter varies the red content of light between 100% and 70%. Varying the position of these filters allows for various ratios of primary colors to be directed through the image source. For example, if a scene was captured under reddish tungsten illuminant using daylight balanced reversal film, the reddish colors could be removed by reducing the red light present in the light source.

In the described embodiment, the image source 14 is a transparent material having an image formed thereon. Preferably, the image is chemically based, such as a silver halide based emulsion. However, it should be appreciated that the image source 14 could also comprise a computer-generated transparency, or any other suitable image.

The image source holder 16 is positioned adjacent the filter array 34 and is designed to position the image source 14 in the light path 42. In the illustrated embodiment, the image source 14 is a roll of photo negatives 36 provided in a source cartridge 38. Accordingly, the image source holder 16 comprises a cartridge compartment for receiving the source cartridge 38, and a source spool 40 for pulling the photo negatives 36 from the source cartridge 38 and selectively positioning frames of the photo negatives 36 in alignment with the light path 42. It should be appreciated that the image source 14 could comprise images other than negatives, such as positives or slides.

In order to properly position the image source 14 relative to the remaining components of the apparatus 10, the image source holder 16 is movable in a plane perpendicular to the light path 42. By alternately advancing and rewinding the film, a second x-axis adjustment is provided. As can be appreciated, instead of moving the image source, the image recapture device could be moved and the image source maintained stationary to allow for cropping of the image.

A read/write source transducer 44 is provided for reading source information from and writing information to the image source 14. For example, such information can be provided on the image source 14 itself or on the source cartridge 38 or frame (e.g., slide frame) which holds the image source 14 in a manner similar to known DX coding. In one embodiment, the information indicates the film type and the emulsion type. In the illustrated embodiment, the source transducer 44 reads information from and writes information to the source cartridge 38. The information is contained on a thin transparent magnetic coating attached to the film. A magnetic read/write transducer determines film characteristics from the film leader and also writes data onto the film.

The sizing element 18 is positioned adjacent the image source holder 16 and in alignment with the light path 42. When used in conjunction with the above-described movable table, the sizing element 18 is designed to allow for sizing of selected areas of the image, thereby allowing for selective cropping, enlargement or reduction of the image. For example, to crop an image, the x-y table can be moved to center the desired portion of the image on the image display device. The sizing element 18 can then be utilized to enlarge or reduce the desired portion of the image to substantially fill up the area of the image target. In the illustrated embodiment, the sizing element is a magnifier in the form of an optical zoom lens.

The deflector 20 is positioned adjacent the sizing element 18, in opposing relation to the image source 14. The deflector 20 is designed to allow the light to travel in at least one of two directions: one direction being toward the image display device 22, and the other direction being toward the image recapture device 24. Such an arrangement allows the image to be viewed on the image display device 22 prior to the image being recaptured on the image recapture device 24. In the illustrated embodiment the deflector 20 comprises a pivoting mirror which can be selectively pivoted between a first position, wherein the light representing the image is deflected toward the image display device 22, and a second position wherein the light is not deflected and travels directly to the image recapture device 24. Other devices such as a beam splitter could also be used. In FIG. 1, the first position of the mirror is illustrated in the solid line, and the second position is illustrated in dashed lines.

The image recapture device 24 of the present invention is designed to store the reformatted image onto an image target 46 (e.g., film). For example, in the illustrated embodiment, the image recapture device 24 comprises a photo camera 48 having a cartridge compartment for receiving a target cartridge 50 having film, a target spool 52 for selectively advancing the film, and shutter mechanism 54 for controlling exposure of the film to the image. Thus, it can be seen that, in the illustrated embodiment, the image recapture device 24 is similar to a standard camera. It should be appreciated that, rather than utilizing film, the image target can instead comprise other forms for recapturing an image, such as an electronic recapturing device. However, since electronic images are easily reformatted without the use of reformatting devices such as is disclosed herein, the applicability of the present invention to electronic images is somewhat limited.

The image recapture device 24 includes a read/write target transducer 56 for reading information from and/or writing information to the image target 46. Such information can relate to the film type, settings of the image recapture device 24, or any other appropriate information. In the illustrated embodiment, the target transducer 56 comprises a magnetic read/write transducer, similar to the source transducer 44, for reading information from the leader of the film.

Since a standard cartridge is used, a variety of film types can be loaded into the apparatus. The apparatus, for instance, can display either slides or negatives. For each of these types of media, a matching emulsion exists depending on a desired application. If a negative is loaded, displayed and reformatted, and a negative of the reformatted image is desired, then negative re-copy film should be inserted into the apparatus and used as the image target. Likewise, if a positive (slide) film is being displayed and reformatted in the same apparatus and a copy slide is desired, then the apparatus will verify that slide re-copy film is loaded as the image target. Using an appropriate film, that same slide can also be used to produce a reformatted negative. The various image target films an also have differing film speed and color balance variations, which are detectable and compensatable by the apparatus. Automatically sensing the film types and reconfiguring exposure and color balance provides an easy-to-use, multi-capacity system.

The image display device 22 is designed to provide a visual indication of the appearance of the image prior to recapturing the image utilizing the image recapture device 24. In the embodiment illustrated in FIG. 1, the image display device 22 comprises an electronic image capture device 58 for receiving the light image and generating an electronic output signal corresponding therewith. For example, such electronic image capture device 58 can comprise an array of charge coupled devices. In addition, the image display device 22 includes a field of view correcting optic 60 for selectively focusing and sizing the selected portion of the image onto the image capture device.

In order to provide for control of the individual components of the apparatus 10, a control device 62 is provided. For example, such control device 62 can comprise a microprocessor. The control device 62 is operatively interconnected with the filter array 34, the source transducer 44, the x-y table, the sizing element 18, the shutter mechanism 54, and the target transducer 56.

The control device 62 can be programmed and/or operated to control each of the various components in order to provide for satisfactory performance of the apparatus 10. For example, the control device 62 can control the filter array 34 to perform color compensation functions to correct for color balance and density. In addition, the control device 62 can read information from and/or write information to the two transducers to exchange information regarding film type, exposure settings, color compensation, or any other desired information. In order to crop the image, the control device 62 can be manually operated to magnify and center the selected portion of the image by manipulating the sizing element 18 and the x-y table. Utilizing information from the transducers, the control device 62 can control the aperture and shutter speed of the shutter mechanism 54 (e.g., for exposure control) and/or the filter array 34 (e.g., for color compensation) to account for differences in films, lighting, or any other variables, to enhance the quality of the recaptured and reformatted image. Also, the video signal produced by the image capture device can be channeled through the control device 62 and subsequently directed through a video output 64 to a video monitor or other appropriate video display device. The image display device can also automatically detect whether slide or negative film has been loaded, and can electronically invert the signal so that the positive image is always displayed on the image display.

Figure 2:
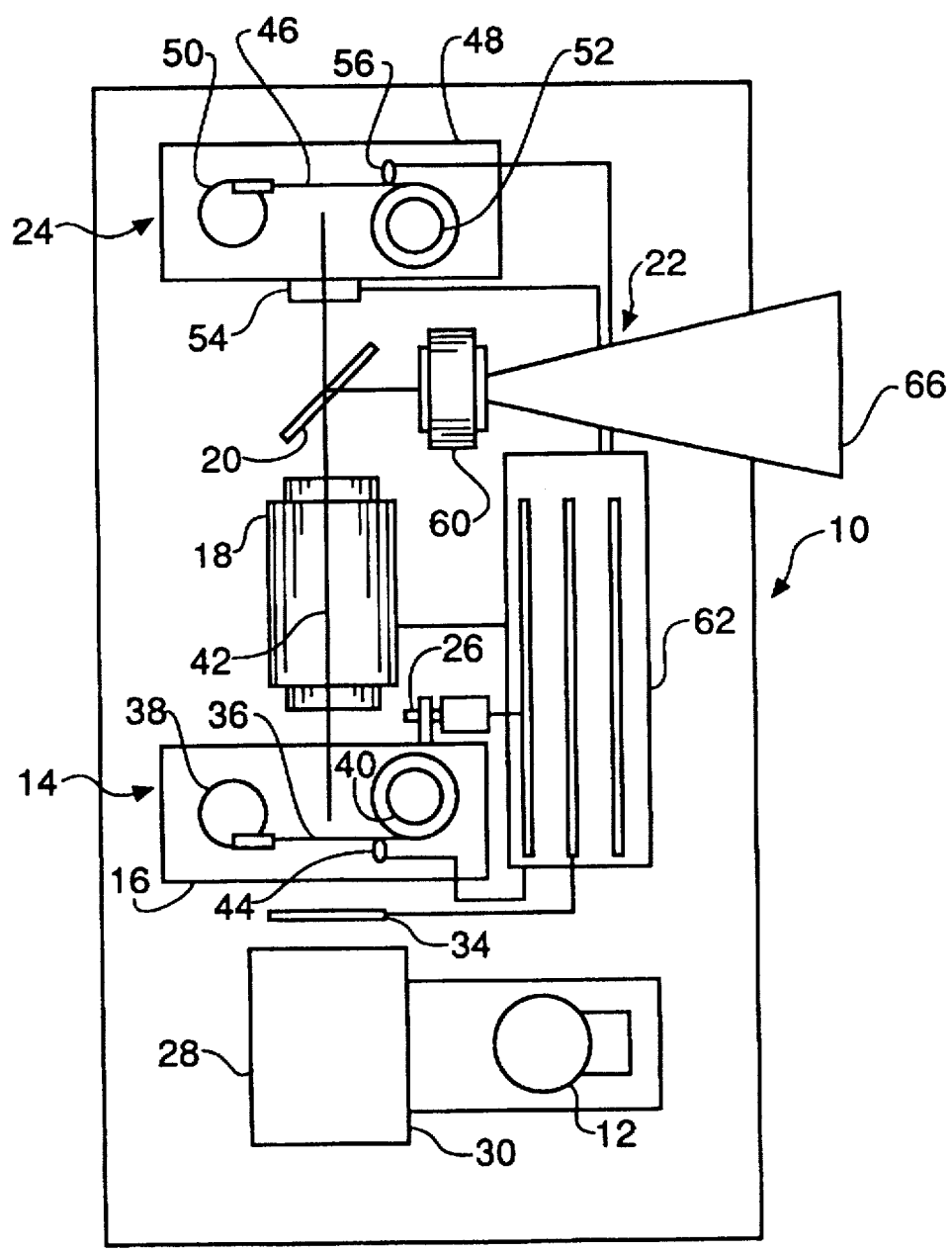
FIG. 2 is a schematic plan view of an alternative embodiment of the present invention.

Referring to FIG. 2, in an alternative embodiment of the present invention, the image display device 22 comprises a user-viewable projection screen 66 in place of the electronic image capture device 58. Such projection screen 66 can comprise, for example, a slide projection screen 66. Such apparatus is limited to display of positive images. However, a user may wish to create copies of either negatives or positives, requiring specific, differing films for each function.

In a preferred embodiment of the present invention, the apparatus 10 is specifically designed to reformat slides. In such an embodiment, the image source holder 16 is a slide holder 16 which can be supplied with slides by, for example, a carousal type slide storage device. The image display device 22 can include a projection screen 66 such that the apparatus 10 acts, in some respects, like a standard slide projector. However, in addition to providing slide projection capabilities, the apparatus 10 would further include image reformatting capabilities. For example, the apparatus 10 preferably includes a sizing element 18 and x-y table for allowing selective magnification and cropping of the image. In addition, the apparatus 10 preferably includes an image recapture device 24, for example, in the form of a standard camera, for recapturing the reformatted image onto film. For example, the apparatus 10 can include a means for detachably connecting a standard camera to the slide projector to allow for recapturing of the image.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

| ELEMENTS IDENTIFIED BY REFERENCE NUMERAL | |
|---|---|
| Reference Numeral | Element |
| 10 | Apparatus |
| 12 | Light source |
| 14 | Image source |
| 16 | Holder |
| 18 | Sizing element |
| 20 | Deflector |
| 22 | Image display device |
| 24 | Image recapture device |
| 26 | Moving device |
| 28 | Integrating box |
| 30 | Light inlet |
| 32 | Light outlet |
| 34 | Filter array |
| 36 | Photo negatives |
| 38 | Source cartridge |
| 40 | Source spool |
| 42 | Light path |
| 44 | Source transducer |
| 46 | Image target |
| 48 | Photo camera |
| 50 | Target cartridge |
| 52 | Target spool |
| 54 | Shutter mechanism |
| 56 | Target transducer |
| 58 | Electronic image capture device |
| 60 | Correcting optic |
| 62 | Control device |
| 64 | Video output |
| 66 | Projection screen |

What is claimed is:

1. An apparatus for use with photographic film having an attached magnetic coating for data storage to transfer images from a source photographic film to a target photographic film, said photographic films each having information on film characteristics stored in said magnetic coating, said apparatus comprising:

an image holder adapted to hold said source photographic film;

a magnetic read/write source transducer disposed to read information from and write information to said source photographic film;

a light source disposed to project light through said source photographic film;

a deflector disposed to receive said light projected through said source photographic film, said deflector defining at least two paths for said light;

an image display device disposed to receive said light from said deflector along one said path;

an image recapture device adapted to hold said target photographic film, said image recapture device being disposed to receive said light along the other said path;

a magnetic read/write target transducer disposed to read information from and write information to said target photographic film;

an image adjustment device disposed in intermediate optical relation to said source photographic film and said target photographic film; and a controller operatively connected to said transducers, and said image adjustment device, said controller having means for adjusting said image adjustment device responsive to said magnetically stored information on film characteristics of said source photographic film and said target photographic film.

2. The camera of claim 1 wherein said image recapture device is a camera disposed to receive said light along the other said path, said camera having a shutter mechanism for controlling exposure of said target photographic film to said light, said camera including said a magnetic read/write target transducer disposed to read information from and write information to said target photographic film; and wherein said controller is operatively connected to said shutter mechanism.

3. The apparatus of claim 1 wherein said source photographic film and target photographic film are disposed in standard film cartridges and said means for adjusting is automatic.

4. The apparatus of claim 1 wherein said deflector is a pivotable mirror.

5. The apparatus of claim 1 wherein said image adjustment device includes a sizing element for transmitting a selected portion of said image.

6. The apparatus of claim 1 wherein said image adjustment device includes movable x-y table operatively associated with said image holder.

7. The apparatus of claim 1 wherein said image display device comprises a projection display.

8. The apparatus of claim 1 wherein said image display device comprises a video display.

9. The apparatus of claim 1 wherein said image adjustment device comprises a color compensation device.

10. The apparatus of claim 1 wherein said image adjustment device comprises an exposure control device.

11. The camera of claim 1 wherein said image recapture device is a camera disposed to receive said light along the other said path, said camera having a shutter mechanism for controlling exposure of said target photographic film to said light, said camera including said a magnetic read/write target transducer disposed to read information from and write information to said target photographic film; and wherein said controller is operatively connected to said shutter mechanism; and wherein said source photographic film and target photographic film are disposed in standard film cartridges and said means for adjusting is automatic.

12. The apparatus of claim 11 wherein said deflector is a pivotable mirror.

13. The apparatus of claim 12 wherein said image adjustment device includes a sizing element for transmitting a selected portion of said image.

14. The apparatus of claim 13 wherein said image adjustment device includes movable x-y table operatively associated with said image holder.

15. The apparatus of claim 14 wherein said image display device comprises a projection display.

16. The apparatus of claim 15 wherein said image display device comprises a video display.

17. The apparatus of claim 16 wherein said image adjustment device comprises a color compensation device.

18. The apparatus of claim 17 wherein said image adjustment device comprises an exposure control device.

19. A method for transfer images from a source photographic film to a target photographic film, said photographic films each having an attached magnetic coating for data storage, said photographic films each having information on film characteristics stored in said magnetic coating, said method comprising the steps of:

magnetically reading information on film characteristics from the source photographic film;

magnetically reading information on film characteristics from the target photographic film;

providing an image adjustment output responsive to said source and target information;

projecting an image from said source photographic film;

adjusting said image responsive to said image adjustment output; and recapturing the modified image on said target photographic film.

20. The method of claim 19 further comprising the step of magnetically writing film information to said target photographic film.

21. The method of claim 19 further comprising the step of magnetically writing film information to said source photographic film.

22. The method of claim 19 further comprising the step of sizing a selected portion of said image.

23. The method of claim 19 further comprising the step of displaying said image.

24. The method of claim 19 further comprising the step of deflecting said image in two directions.

25. The method of claim 19 further comprising the step of magnetically writing film information to said target photographic film and said source photographic film.

26. The method of claim 25 further comprising the step of sizing a selected portion of said image.

27. The method of claim 26 further comprising the step of displaying said image.

28. The method of claim 27 further comprising the step of deflecting said image in two directions.

* * * * *